April 2, 1940.  W. H. SILVER  2,196,037
TRACTOR MOUNTED IMPLEMENT
Filed April 9, 1937  3 Sheets-Sheet 3

WITNESS
Norman C. Westling

INVENTOR
WALTER H. SILVER
BY
ATTORNEYS

Patented Apr. 2, 1940

2,196,037

UNITED STATES PATENT OFFICE 2,196,037

TRACTOR MOUNTED IMPLEMENT

Walter H. Silver, Moline, Ill., assignor to Deere & Company, Moline, Ill., a corporation of Illinois Application April 9, 1937, Serial No. 135,866

13 Claims. (Cl. 97—47)

The present invention relates to tractor mounted agricultural implements of the type comprising a ground working tool carrying frame disposed beneath the tractor and extending from a pivotal draft connection near the forward end of the tractor to a ground working tool behind the tractor which is raised and lowered by the power lift mechanism of the tractor, operating through lift connections on the implement frame to swing the latter vertically about its forward pivot.

Certain problems have been encountered in connection with some of the larger implements, such as listers, due to the fact that their heavy weight approaches closely to the maximum lifting capacity of the power lift mechanism of the tractor and imposes heavy stresses in some of the lifting connections, especially when such implements are used in heavy damp soil. One difficulty that is encountered when using a spring draft connection between the draft frame and the tractor, is that when the lister bottom strikes an obstacle or meets with an especially high ground resistance, the implement is retarded against the action of the draft spring and drops back relative to the tractor until the slack is taken up in the lifting connections and draft load is thereby imposed on the power lift mechanism, sometimes resulting in damage by breaking or bending the parts.

One object of the present invention has to do with the provision of lifting connections that will allow considerable movement of the implement relative to the tractor without overstressing the parts.

Another object relates to the provision of lifting connections for each end of the power lift rock shaft which connections share the load of the implement frame substantially equally, whereby the stresses in the lifting parts are minimized.

A further object relates to the provision of resilience in the lifting connections to eliminate the destructive effect on the power lift mechanism of the tractor due to the jarring of a heavy implement while it is being transported in lifted position to and from the field.

Still another object has to do with providing a counterbalancing spring which is operative during an initial portion of the lifting operation to assist in raising the implement out of the ground, lost motion being provided in the connections of the spring to prevent buckling of the spring when the implement is raised beyond that portion of the movement.

A further object is concerned with connecting the counterbalancing spring between parts of the implement assembly to eliminate separate spring connections on the tractor body.

Other objects will be apparent after a consideration of the following description of an embodiment of my invention in which reference will be made to the drawings appended hereto in which, Figure 1 is a plan view of a two-row tractor mounted lister illustrating the principles of my invention;

Figure 1:
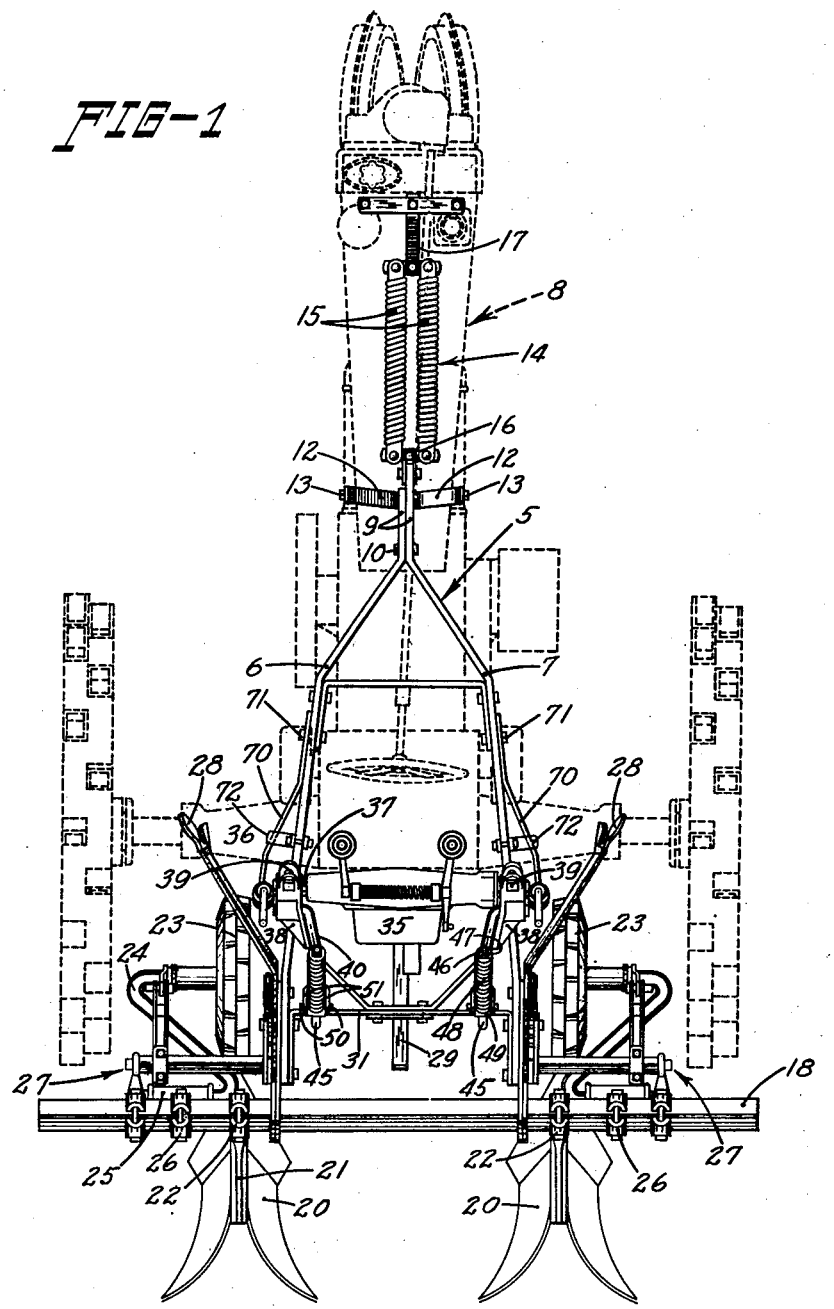
Figure 2:
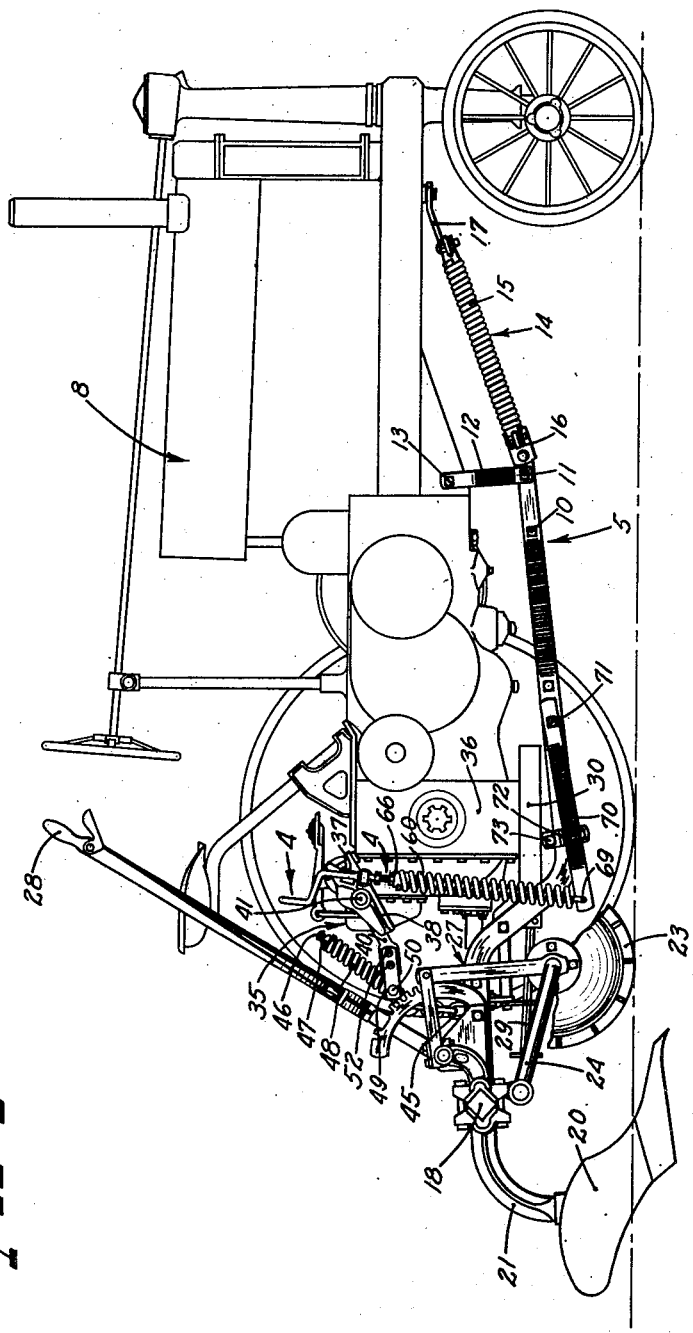
Figure 2 is a side elevation of the implement mounted on a tractor, the right rear wheel of which is removed to more clearly illustrate the invention, the implement being shown in ground working position.

Referring now to the drawings and more particularly to Figures 1 and 2, the lister comprises a draft frame 5 which includes a pair of draft beams 6, 7, disposed longitudinally underneath the tractor, the latter being designated in its entirety by the reference numeral 8. The forward ends 9 of the draft beams 6, 7 are juxtaposed and are secured together by bolts 10 and 11. A pair of vertically disposed hangers 12 are pivotally connected to the forward ends 9 of the beams on the forward bolt 11 and extend upwardly to pivotal connections 13 on the tractor body. One of the ends 9 is extended to provide a connection to a spring hitch 14 of more or less conventional design, the latter comprising a pair of parallel helical springs 15 connected to the extended end of the draft beam by a suitable shackle 16, the forward end of the hitch 14 being connected to the bottom of the tractor frame by a strap 17. The draft beams 6, 7 extend rearwardly under the tractor in diverging relation and are connected at their rear ends to a transversely extending tool beam 18 disposed behind the tractor. Since this implement is described and illustrated in detail in my Patent No. 2,144,347, granted January 17, 1939, a detailed description will not be necessary here except to point out that the implement includes a pair of laterally spaced lister bottoms 20 supported on curved shanks 21 which are laterally adjustable along the tool beam 18 and are secured at any desired spacing by clamps 22. A pair of gauge wheels 23 are journaled at the ends of a pair of Z-shaped crank axles 24, respectively, which are swingably supported in brackets 25, the latter being similarly adjustable along the tool beam 18 and secured in suitable operating positions by clamps 26. The gauge wheels are preferably adjusted to operate directly in front of the lister bottoms 20 and can be raised and lowered by means of suitable linkage mechanism 27, operable by means of hand levers 28. Thus it is evident that the implement frame 5 is free to swing vertically about its forward pivot 11 and, therefore, the tools 20 are maintained at a predetermined working depth by the gauge wheels 23 regardless of the vertical movements of the tractor. Lateral swinging of the implement frame 5 is prevented by means of a rearwardly extending ball member 29 which is pivotally connected for vertical swinging movement to the drawbar frame 30 of the tractor and which engages a transverse bracing member 31.

Coming now to that portion of the implement with which the present invention is more particularly concerned, the implement is raised and lowered between normal operating position and inoperative or transport position through lifting connections which will be described hereafter, by means of power lift mechanism indicated generally by the reference numeral 35, of any suitable type but preferably of the type disclosed in U. S. Patent No. 2,107,760, granted February 8, 1938 to McCormick, Stewart and Worthington. This mechanism is bolted to the rear of the axle housing 36 of the tractor and operates through an actuating rock shaft 37. The implement is connected to the power lift rock shaft 37 through a pair of lifting arms 38 which are attached at opposite ends, respectively, of the rock shaft 37 by clamps 39. Pivoted to each of these lifting arms 38 are a pair of extension arms 40, respectively. The extension arms 40 are journaled at their inner ends 41 intermediate of the ends of the lifting arms 38 and are adapted to swing relative to the lifting arms 38 in a vertical plane, but are prevented from swinging past the outer ends of the lifting arms 38 by suitable stops on the latter, as disclosed in detail in my Patent No. 2,140,144, granted December 13, 1938.

Figure 3:
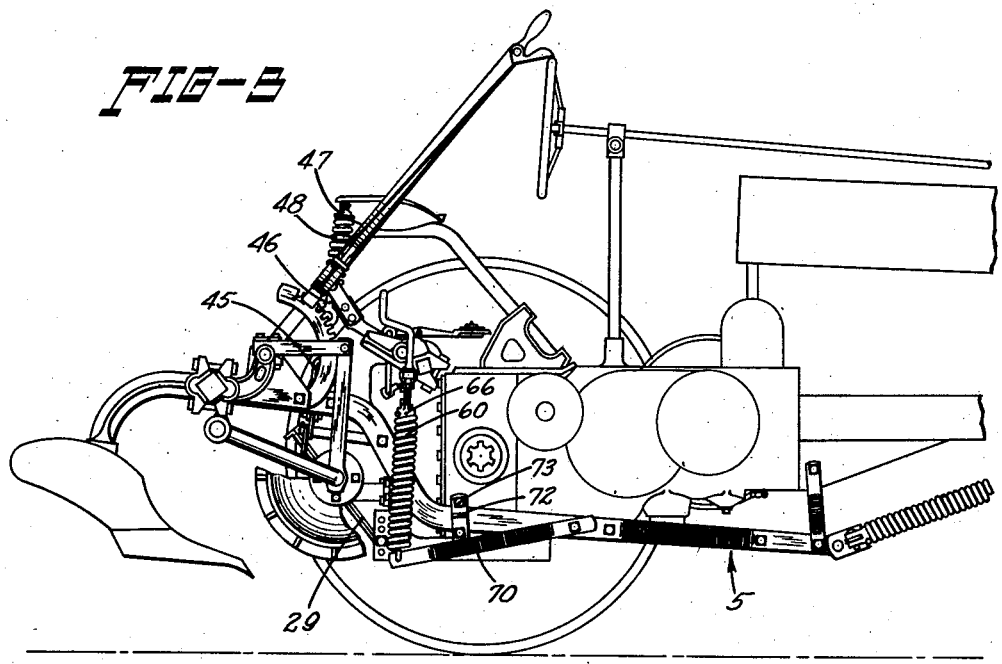
Figure 3 is a side elevation showing the implement in raised or transport position.

The outer end of each of the extension arms 40 is connected to the transverse bracing member 31 of the implement frame 5 through a chain 45, the upper end of which is connected to an upwardly extending rod 46, the upper end of which is threaded to receive a nut 47. A helical spring 48 surrounds the rod 46 and bears at its upper end upon the nut 47. The lower end of the spring 48 bears upon a collar 49 encircling the rod 46, the collar having a pair of laterally extending trunnions 50. These trunnions are journaled in the ends of a pair of straps 51 which are secured to the end of the extension arm 40 by suitable rivets 52. Thus it is clear that as the power lift mechanism 35 rotates the rock shaft 37 in a clockwise direction, as viewed in Figure 2, the lifting arm and its extension 40 are pivoted about the axis of the rock shaft 37 in a clockwise direction, causing the implement frame 5 to swing upwardly about its forward pivot 11 by forcing the collar 49 upwardly against the compression of the spring 48, thereby exerting the lifting force through the nut 47 upon the rod 46 and the chain 45 and raising the implement to the position illustrated in Figure 3.

In the raised position the implement is carried on the springs 48 which absorb the jarring of the tractor as it runs along the road and thus preventing the inertia of the heavy implement from imposing excessive strains in the power lift mechanism. During the lifting operation as well as in the transport position, the springs 48 tend to distribute the weight of the implement upon the two lifting arms substantially equally, thus preventing excessive stress in one set of lifting connections which would otherwise result in the absence of the springs 48 if one chain 45 was slightly longer than the other. In order to augment the lifting force of the power lift mechanism during the first portion of the lifting stroke while the earth engaging tool 20 is being torn out of the ground, a counterbalancing spring 60 is provided. This spring is in the form of a long helical spring in order that the tensional force of the spring does not increase too rapidly as the implement is adjusted to lower depths of operation.

Since the lifting arms 38 together with their connections to the lister frame, are a part of the lister assembly and are disconnected from the rock shaft 37 when the lister is removed from the tractor, the lifting arm 38 provides an advantageous point of attachment for the upper end of the spring 60, thereby eliminating any separate connections for the spring on the body of the tractor.

Figure 4:
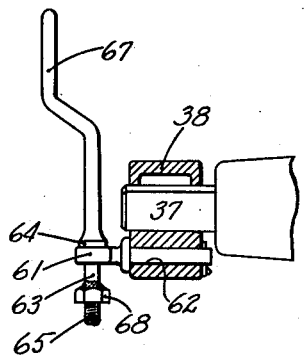
Figure 4 is a detail, partly in section, taken along a line 4—4 in Figure 2.

The details of the upper connection are shown more clearly in Figure 4, and comprise an eye bolt 61, rotatably supported within an aperture 62 in the lifting arm 38 immediately beneath the power lift rock shaft 37. A rod 63 extends vertically through the eye of the eye bolt 61 and is supported by the latter by means of a shoulder 64 formed on the rod 63 and which engages the eye bolt 61. The lower end of the rod 65 is threaded to receive a nut 66 to which is fastened the upper end of the counterbalancing spring 60. The upper end of the rod is formed into a handle 67 and by cranking this handle the nut 66 is moved upward or downward along the threaded portion 65 of the rod. A stop nut 68 welded to the rod at the upper end of the threaded portion serves as a stop or upper limit of travel of the nut 66.

The lower end of each of the springs 60 is hooked through an aperture 69 at the rear end of a lever 70. The forward ends of the levers 70 are pivoted on bolts 71 on the sides of the draft beams 6, 7, respectively. Thus the beams 6, 7 are free to move upwardly relative to the levers 70 but movement of the beams below the levers 70 is prevented by stops 72 clamped by bolts 73 to the beams 6, 7, respectively, and are adapted to engage the levers 70 as the implement frame is lowered into ground working position, as shown in Figure 2, thereby placing the springs 60 in tension when in normal operating position. When the implement is raised from ground working position, the tensional force of the spring aids the power lift mechanism in raising the lister bottom 20 out of the ground until the tension of the spring has been released, after which further raising of the implement frame moves the stop 72 upwardly away from the lever 70, leaving the spring in released position. The purpose of this lost motion connection is to prevent the long spring from buckling and thus prevent it from catching on, or being damaged by other parts of the lister frame. After loosening the bolts 73, the stops 72 can be adjusted longitudinally along the beams 6, 7 so that they may be adjusted to engage their respective levers 70 simultaneously.

During operation of the implement, whenever the lister bottom strikes an obstacle or suddenly encounters soil of high resistance, the draft spring 14 will be stretched, allowing the implement to drop back relative to the tractor. Obviously if the lifting arm 40 were connected by an unyieldable connection to the lister frame, an excessive draft load might be imposed upon the lifting connections, but with the spring arrangement shown and described herein, this draft load is greatly decreased and, therefore, damage to the lifting mechanism from this source is eliminated.

I claim:

1. In combination with a tractor, engine-driven power lift mechanism mounted thereon and including a rock shaft actuated by said mechanism, a lifting arm rigidly connected to said rock shaft, an implement having draft means connected to said tractor, said implement being movable vertically between operative and inoperative positions, spring lifting means connecting said implement to said lifting arm, and counterbalancing spring means acting upwardly upon said implement and connected to said lifting arm adjacent said rock shaft.

2. In combination with a tractor having engine-driven power lift mechanism including a rock shaft actuated by said mechanism and a lifting arm fixed on said shaft, a ground working tool disposed behind said tractor, draft means therefor including a forwardly extending member swingably attached to said tractor, means for connecting said member to said lifting arm near the outer end thereof, and counterbalancing spring means connecting said member to said arm adjacent the inner end thereof.

3. In combination with a tractor, engine-driven power lift mechanism mounted thereon and including a rock shaft actuated by said mechanism, a lifting arm rigidly connected to said rock shaft, an implement having draft means connected to said tractor, said implement being movable vertically between operative and inoperative positions, means for connecting the outer end of said lifting arm to said implement for lifting the latter by power from the tractor engine, and counterbalancing spring means connected between said implement and said arm near said rock shaft.

4. In combination with a tractor, engine-driven power lift mechanism mounted thereon and including a rock shaft actuated by said mechanism, a lifting arm rigidly connected to said rock shaft, an implement having draft means connected to said tractor, said implement being movable vertically between operative and inoperative positions, means for connecting the outer end of said lifting arm to said implement for lifting the latter by power from the tractor engine, a bracket swivelly connected to said lifting arm near the axis of rotation thereof, and a counterbalancing spring connected between said bracket and said implement.

5. In combination with a tractor, power lift mechanism mounted thereon including a rock shaft and a lifting arm fixed thereto, an implement associated with said tractor including longitudinally extending draft means disposed under said tractor and coupled thereto, said draft means being vertically swingable to move said implement between a lowered or working position and a raised or inoperative position, spring means connecting the outer end of said lifting arm to said implement, said spring means being under stress when said implement is in raised position, and additional spring means connecting said implement to said lifting arm at a point on said arm spaced inwardly from said outer end thereof, said additional spring means being under stress when said implement is disposed in lowered position.

6. In combination with a tractor, a ground-working implement including a frame pivotally connected to said tractor and swingable vertically into and out of ground working position, mechanism for lifting said frame, an auxiliary spring for providing an additional lifting force during an initial portion of the lifting movement, means for connecting one end of said spring to said tractor, and means for connecting the other end thereof to said frame, said last-named means including a lost motion device for disengaging said spring from said frame at the end of said initial portion of the lifting movement to permit completion of the lifting movement of the frame independent of the spring.

7. In combination with a tractor, a ground-working implement including a frame pivotally connected to said tractor and swingable vertically into and out of ground working position, mechanism for lifting said frame, means for providing an additional lifting force during an initial portion of said lifting movement comprising a helical spring adapted to be stressed in tension during said initial portion, means for connecting one end of said spring to said tractor, and means for connecting the other end thereof to said frame, said last-named means including a lost motion device for disengaging said spring from said frame when said frame is raised beyond said initial portion of movement to prevent buckling of the spring.

8. In combination with a tractor, a ground-working implement including a frame pivotally connected to said tractor and swingable vertically into and out of ground working position, mechanism for lifting said frame, an auxiliary spring for providing an additional lifting force during an initial portion of the lifting movement, means for connecting one end of said spring to said frame including a lost motion device for disengaging said spring from said frame at the end of said initial portion of the lifting movement, and means for connecting the other end of said spring to said tractor, said last-named means including means for adjusting the extent of said initial portion of said lifting movement.

9. In combination with a tractor, a ground-working implement including a frame pivotally connected to said tractor and swingable vertically into and out of ground working position, mechanism for lifting said frame, means for providing an additional lifting force during an initial portion of said lifting movement comprising a helical spring adapted to be stressed in tension during said initial portion, means for connecting one end of said spring to said tractor, and means for engaging the other end thereof with said frame during only said initial portion of the lifting movement, said last-named means comprising a lever swingably disposed with respect to said frame, and a stop on said frame adapted to engage said lever, said spring being attached to said lever, thereby exerting a yielding force upon said frame through said lever and said stop, tending to lift said frame as long as said spring is stressed in tension, after which further lifting movement of said frame moves said stop away from said lever.

10. In an agricultural implement having a main supporting frame and a member swingably supported thereon for angular movement relative to said frame, means for exerting a force against said member through a portion of its angular movement, said means comprising a spring attached to said supporting frame, a lever swingably disposed relative to said member and connected to said spring, and a stop fixed on said member and adapted to engage said lever.

11. In an agricultural implement having a main supporting frame and a member swingably supported thereon for angular movement relative to said frame, means for exerting a force against said member through a portion of its angular movement, said means comprising a spring attached to said supporting frame, a second member connected to said member for pivotal movement relative thereto, said spring being connected to said second member at a point spaced from the axis of pivotal movement thereof, and a stop fixed to one of said members and adapted to engage the other of said members.

12. In combination with a tractor, engine-driven power lift mechanism mounted thereon and in including a rock shaft actuated by said mechanism, a lifting arm rigidly connected to said rock shaft, an implement having draft means connected to said tractor, said implement being movable vertically between operative and inoperative positions, means for connecting the outer end of said lifting arm to said implement for lifting the latter by power from the tractor engine, a helical counterbalancing spring, means for connecting one end of said spring to said lifting arm adjacent said rock shaft, and means for connecting the other end of said spring to said implement, said last-named means comprising a lever pivotally connected to said implement, and means for limiting the pivotal movement of said lever relative to said implement in one direction, said spring being connected to said lever for exerting a lifting force on said implement, auxiliary to said power lift mechanism, through said lever and said limiting means as long as said spring is stressed in tension, whereafter further lifting movement of said implement effects relative angular movement between said lever and said implement.

13. In combination with a tractor, a ground working implement including a frame pivotally connected to said tractor and swingable vertically into and out of ground working position, mechanism for lifting said frame, an auxiliary spring for loading an appreciable portion of the weight of said implement on said tractor during ground working operation and for providing an additional lifting force during an initial portion of the raising movement, said spring being of sufficient length to provide a substantially constant lifting force on said implement over the range of vertical movement of the latter relative to the tractor incidental to normal ground working operation, and means for connecting said spring between said tractor and said implement frame including a lost motion device for transmitting said lifting force during said ground working operation and over said initial portion of raising movement and adapted to disengage said spring at the end of said initial portion to permit completion of the raising of the implement through said lifting mechanism independent of said spring.

WALTER H. SILVER.